Nov. 21, 1944.                W. L. HOWLAND                2,363,181
                                STRAIN GAUGE
                             Filed July 12, 1943
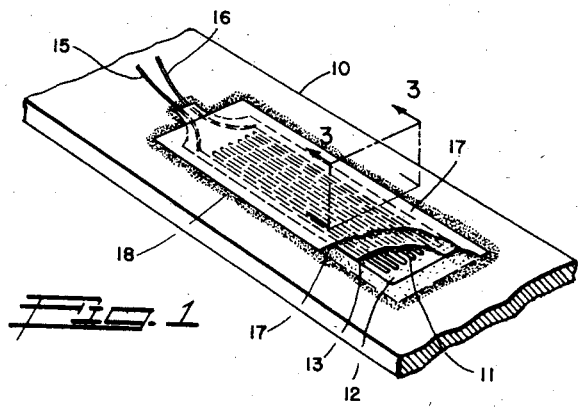
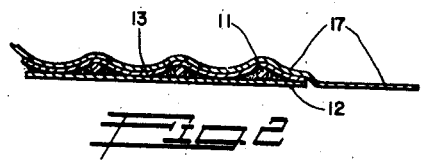
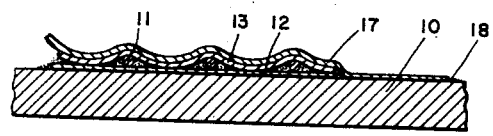
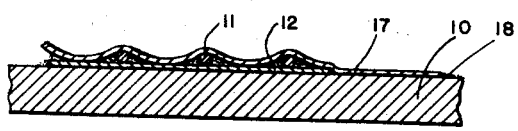
Inventor
Walter L. Howland
By *George C. Sullivan*
Agent Patented Nov. 21, 1944

2,363,181

UNITED STATES PATENT OFFICE 2,363,181

STRAIN GAUGE

Walter L. Howland, Pasadena, Calif., assignor to Lockheed Aircraft Corporation, Burbank, Calif.

Application July 12, 1943, Serial No. 494,428

12 Claims. (Cl. 201—63)

This invention relates generally to strain measuring and testing devices and more particularly to electrical strain gauges for determining the strain of a structural member subjected to stress.

It has long been known that the electrical resistance of electrically conductive metals varies in accordance with certain functions of the strain to which they are subjected and this phenomenon, termed strain-sensitivity, has been employed in the so-called wire-wound type of strain gauge which employs a length or a plurality of series-connected parallel lengths of fine wire bonded by a suitable adhesive to the member to be stressed whereby the strain of the member is imparted to the wire. The resultant variation in the electrical resistance of the strain sensitive wire is usually measured by a Wheatstone bridge in which the strained wire constitutes one arm of the bridge. The bridge galvanometer may be conveniently calibrated to give a reading of strain in inches or stress in pounds. The conventional method of manufacture and use of such strain gauges is more fully disclosed in the United States Patent No. 2,292,549 filed February 23, 1940.

It is also well known that the sensitivity of a Wheatstone bridge and most other circuits employed in the measurement of resistances is directly proportional to the magnitude of the current which can be carried by the resistance circuit being measured. In view of this it is apparent that the sensitivity of measurement of strain by means of such a wire strain gauge is accordingly directly proportional to the current which can be passed through the strain sensitive element of the gauge and this in turn is proportional to the permissible operating temperature and effective heat dissipating capacity of the gauge element as a whole when attached in readiness for use, to the member to be stressed.

Heretofore, the current carrying capacity of such strain-sensitive wire element gauges has been so limited as to require the employment of some method of amplification in conjunction with the Wheatstone bridge circuit in order to attain the requisite high sensitivity of the strain measurement.

It is accordingly an object of this invention to provide an improved electrical strain gauge having increased current carrying capacity and sensitivity over those heretofore employed.

It is a further object of this invention to provide an electrical strain gauge having improved durability and increased accuracy and consistency of calibration in use over long periods of time.

The object of this invention are in general accomplished by providing means for dissipation of a greater quantity of heat from the gauge element than that inherent in the type of strain gauges heretofore employed.

The invention in its broadest aspect resides in a strain gauge comprising a continuous strain-sensitive metallic filament cemented to and adapted to partake of the strain of the member to be stressed with a relatively thin, heat conductive covering for the gauge placed closely adjacent and in heat conductive relation to both the filament and the member to be stressed whereby the heat generated within the gauge element may be dissipated through the said covering to the air and to the surrounding mass of the member to be stressed.

These and other objects, advantages, and features of novelty will be evident hereinafter.

In the drawing which illustrates preferred embodiments of the invention;

Figure 1 is a perspective view of the general assembly and arrangement of the invention as applied to a member to be stressed;

Figure 2 is an enlarged cross-sectional view of that portion of the strain gauge cut by plane 3—3 of Figure 1 as it appears prior to attachment to a member to be stressed.

Figure 3 is an enlarged cross-sectional view taken on plane 3—3 of Figure 1.

Figure 4 is a fragmentary cross-sectional view illustrating an alternative construction and mode of application of the invention.

Referring now to the drawing in which the same reference characters refer to the same or similar elements, 10 is a portion of a member to be stressed which, for example, may be a structural element such as a web or flange of a beam in which it is desired to measure the strains or stresses under varying loading conditions. The strain sensitive filament is shown at 11 and may be formed of a continuous length of fine metal wire wound back and forth in a plurality of closely spaced, parallel runs as shown and firmly cemented in this form between two thin insulating membranes 12 and 13. A number of sizes and types of strain-sensitive wires such as Nichrome, Copel, Constantin, Advance, and others may be employed. For example, a strain-sensitive element composed of fourteen series-connected, parallel runs, each one inch long, formed of a continuous length of .002 inch diameter Nichrome wire with the runs spaced approximately .023 inch center to center and cemented between two membrances of thin rice paper in the manner shown, was satisfactorily employed for stress measurements on an aluminum alloy structural member.

The leads 15 and 16 through which electrical connections to the filament 11 are made may be No. 30 cotton covered copper wire and the filament 11 and wire leads 15 and 16 may be cemented between the membranes 12 and 13 as beforementioned by means of a cellulose acetate or nitrate lacquer or with Glyptol or other suitable insulating material to form a firm strain-sensitive, resistance element.

A sheet of metal foil 17 having an area substantially larger than that of the element comprising the membranes 12 and 13 containing the strain-sensitive filament 11 is attached to one face of the said element by a suitable cementing material and pressed in close contact therewith preferably against a flat surface backing to form a unit assembly having an appearance in cross-sectional view similar to that shown in Figure 2. The metal foil 17 for best results should be applied and pressed into contact and close conformation with the surface contour of the element 11, 12, 13, in such a manner as to make a connection with both the gauge wire and surrounding adhesive materials which is as mutually thermally conductive as possible. The cement used for this purpose preferably should be one not dependent upon the evaporation of a volatile solvent for its setting. A chemically-setting cement such as Litharge may be employed or a thermosetting or thermoplastic cement such as de Khotinsky is also well suited to this purpose. The metal sheet 17 may be .0005 inch aluminum, or silver foil, or other similar metal having good heat conductivity and high ductility.

In an alternative construction of the strain-sensitive gauge unit instead of cementing the filament 11 between two paper membranes 12 and 13 prior to attaching the metal foil 17 as hereinbefore described, the outermost paper membrane 13 may be omitted and the filament cemented directly between the metal foil 17 and a single paper membrane 12 as illustrated in Figure 4. In this construction the inner surface of the metal foil 17 or the filament or both are first thinly coated with a suitable electrical insulating lacquer or enamel which is allowed to harden before assembly. The filament is then cemented between the coated surface of the metal foil and the membrane by a cementitious material which preferably will not destroy the previously formed insulating coatings on the foil and wire. An advantage of this construction resides in the increased heat conductivity between the filament and metal foil which it affords.

In applying the gauge units carrying the metal foil covering, the surface of the member to which a gauge unit is to be attached is first cleaned with alcohol, acetone or similar solvent to free it of oil, grease, or other foreign matter which may impair the cemented bond. The gauge unit is then applied to the surface of the member with the metal foil on the outside and the runs of the filament positioned parallel with the direction of the strain to be measured and the whole cemented in place by a suitable adhesive cement preferably a chemical or thermosetting cement such as Litharge or de Khotinsky which will not require the liberation of a volatile solvent for setting.

When the de Khotinsky cement is used it is best applied by first heating the surface of the member to which the gauge unit is to be attached to a temperature sufficient to melt the cement upon contact therewith and then melting a quantity of the cement against the heated surface to wet the area to be covered by the gauge unit. When the area has been thus covered by a layer of melted cement the gauge unit is then pressed into firm and uniform contact therewith, and held until the cement has cooled and set. Sufficient cement should be used to leave a small fillet of cement 18 extending between the exposed edges of the metal foil covering and the surface of the member to which it is attached.

The gauge and metal foil covering should be pressed into as close contact as possible with the surface of the member to which it is attached consistent with good cement bonding, in order that the thermo-conductivity between the foil and member may have a maximum value. With the addition of the metal foil covering in the manner of the present invention as hereinbefore described, it has been possible to increase the current carrying capacity of such gauges by approximately twenty percent over that permissible for gauges of conventional design, thereby increasing the sensitivity in the same proportion.

This increase in sensitivity is important since it is sufficient to make the direct measurement of the strain gauge resistance by means of a Wheatstone bridge entirely practical without the necessity of employing amplifiers.

Another advantage of the strain gauge construction of this invention as hereinbefore described, resides in the resultant improved consistency and stability of operation and prolonged durability. The metal foil covering in addition to augmenting the sensitivity of the gauge apparently serves to protect the gauge element body against the detrimental effect of moisture and mechanical damage and also greatly reduces the rate of photo-chemical deterioration of the cementing constituents.

It is to be understood that throughout the specifications where the term electrically conductive wire or filament is used, particularly in connection with the strain-sensitive element, it is intended to include round or square sectioned wires or ribbons or the like suitable conductors.

The foregoing is merely illustrative of a preferred embodiment of the invention and is not to be limiting but is to include all variations which may be made by those skilled in the art within the scope of the appended claims.

I claim:
1. An electrical strain gauge for measuring strain in a body subjected to variable stress comprising a filament of electrical conducting material whose electrical resistance varies as a function of its strain and a sheet of metal foil adhesively bonded to said filament throughout the effective length of said filament.

2. An electrical strain gauge for measuring strain in a body subjected to variable stress comprising a filament of electrical conducting material whose electrical resistance varies as a function of its strain and a sheet of metal foil adhesively bonded to and electrically insulated from said filament throughout its effective length.

3. An electrical strain gauge for measuring strain in a body subjected to variable stress comprising a filament of electrical conducting material whose electrical resistance varies as a function of its strain and a sheet of metal foil adhesively bonded in thermoconductive contact with and electrically insulated from said filament throughout its effective length.

4. An electrical strain gauge for measuring strain in a body subjected to variable stress comprising a filament of electrical conducting material whose electrical resistance varies as a function of its strain, a support for said filament adhesively bonded to said filament throughout the effective length of said filament, said support comprising a thin, metal foil, at least a portion of the area of which is adapted to be bonded to the surface of the said body.

5. An electrical strain gauge for measuring strain in a body subjected to variable stress comprising a filament of electrical conducting material whose electrical resistance varies as a function of its strain, a support for said filament bonded to said filament throughout its effective length, said support comprising a thin, metal foil in heat conductive contact with and electrically insulated from said filament, at least a portion of the area of which is adapted to be bonded to the surface of the said body.

6. An electrical strain gauge for measuring strain in a body subjected to variable stress comprising a filament of electrical conducting material whose electrical resistance varies as a function of its strain, a support for said filament adhesively bonded to said filament throughout its effective length, said support comprising a thin, metal foil in heat conductive contact with and electrically insulated from said filament, at least a portion of the area of which is adapted to be adhesively bonded to the surface of the said body.

7. An electrical strain gauge for measuring strain in a body subjected to variable stress comprising a plurality of substantially parallel runs of a filament of electrical conducting material whose electrical resistance varies as a function of its strain, a support for said filament adhesively bonded to said filament throughout its effective length, said support comprising a thin, metal foil in heat conductive contact with and electrically insulated from said filament, at least a portion of the area of which is adapted to be adhesively bonded to the surface of the said body.

8. An electrical strain gauge for measuring strain in a body subjected to variable stress comprising a plurality of series-connected, substantially parallel runs of a filament of electrical conducting material whose electrical resistance varies as a function of its strain, a support for said filament adhesively bonded to said filament throughout its effective length, said support comprising a thin, metal foil in heat conductive contact with and electrically insulated from said filament, at least a portion of the area of which is adapted to be adhesively bonded to the surface of the said body.

9. An electrical strain gauge, according to claim 2, in which the foil comprises aluminum.

10. An electrical strain gauge, according to claim 2, in which the foil comprises silver.

11. An electrical strain gauge, according to claim 7, in which the foil comprises aluminum.

12. An electrical strain gauge, according to claim 7, in which the foil comprises silver.

WALTER L. HOWLAND.